United States Patent
Yang et al.

(10) Patent No.: US 9,736,349 B2
(45) Date of Patent: Aug. 15, 2017

(54) ADAPTIVE VIDEO END-TO-END NETWORK WITH LOCAL ABSTRACTION

(71) Applicants: Shao-Wen Yang, Hillsboro, OR (US); Yen-Kuang Chen, Cupertino, CA (US)

(72) Inventors: Shao-Wen Yang, Hillsboro, OR (US); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/582,524

(22) Filed: Dec. 24, 2014

(65) Prior Publication Data

US 2016/0191779 A1    Jun. 30, 2016

(51) Int. Cl.
*H04N 5/225* (2006.01)
*H04N 5/232* (2006.01)
*H04N 5/247* (2006.01)
*H04N 7/18* (2006.01)

(52) U.S. Cl.
CPC ......... *H04N 5/23206* (2013.01); *H04N 5/247* (2013.01); *H04N 7/181* (2013.01); *H04N 7/188* (2013.01)

(58) Field of Classification Search
CPC .. H04N 5/23206; H04N 5/2258; H04N 7/188; H04N 7/181; H04N 5/247
USPC ...... 348/222.1, 207.1, 207.11, 552, 143, 144
See application file for complete search history.

(56) References Cited

U.S. PATENT DOCUMENTS

| | | | |
|---|---|---|---|
| 2008/0252723 A1* | 10/2008 | Park | G06K 9/00771 348/143 |
| 2011/0067101 A1* | 3/2011 | Seshadri | G06F 21/552 726/22 |
| 2012/0300081 A1* | 11/2012 | Kim | G08B 13/19656 348/159 |
| 2014/0085480 A1* | 3/2014 | Saptharishi | H04N 7/181 348/159 |

* cited by examiner

*Primary Examiner* — Yogesh Aggarwal
(74) *Attorney, Agent, or Firm* — Blakely, Sokoloff, Taylor & Zafman LLP

(57) ABSTRACT

An adaptive video end-to-end network is described that uses local abstraction. One example includes an image sensor to generate a sequence of images, a processor coupled to the image sensor to analyze the sequence of images to detect an event, to select images related to the event and to generate metadata regarding the event, and a communications interface coupled to the processor to send the metadata information through a network connection to a central node.

20 Claims, 6 Drawing Sheets

ADAPTIVE VIDEO END-TO-END NETWORK WITH LOCAL ABSTRACTION

FIELD

The present description relates to networked sensors and in particular to local abstraction of detected features.

BACKGROUND

Visual understanding is, nowadays, a demanding cognitive task with a set of forms, methodologies, tools, and approaches that can turn data from many separable and discrete elements into information. This information can be used to reason about the world. Computer vision technologies make "things" much more intelligent, responsive, and smarter. High performance computers have become widely available at relatively low cost, which makes it possible to use high performance computers to detect, track, and recognize objects of interest with the variety of cameras. The collected data can subsequently be used to derive actionable insights that can define business value, drive changes, measure business impact, etc. This can happen automatically without lifting a finger.

Cameras, e.g., analog and digital video surveillance cameras, are everywhere. They are seen on street corners, at road intersections, in parking lots, in chain stores, surrounding private properties, etc., however, the cameras are underused. The volume of data produced by the cameras is overloading the network. The volume of data is overloading the computational capability of the systems to which it connects. The data comes from different types of sensors such as video data and conventional sensors like light sensors, accelerometers, etc. so that actionable insights cannot be generated without semantically meaningful annotations.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Onboard semantic abstractions may be used to enable end-to-end video analytics that offload the computation-intensive operations of computer vision, image processing, machine learning, etc. from a gateway or private cloud to a video sensor. In some embodiments, smart sensors analyze the data before transmission and send only a portion of a video stream and only for a limited time. This reduces processing at a central node (CN), such as an edge, gateway, and the cloud and reduces the amount of and rate of data transmission.

Figure 1:
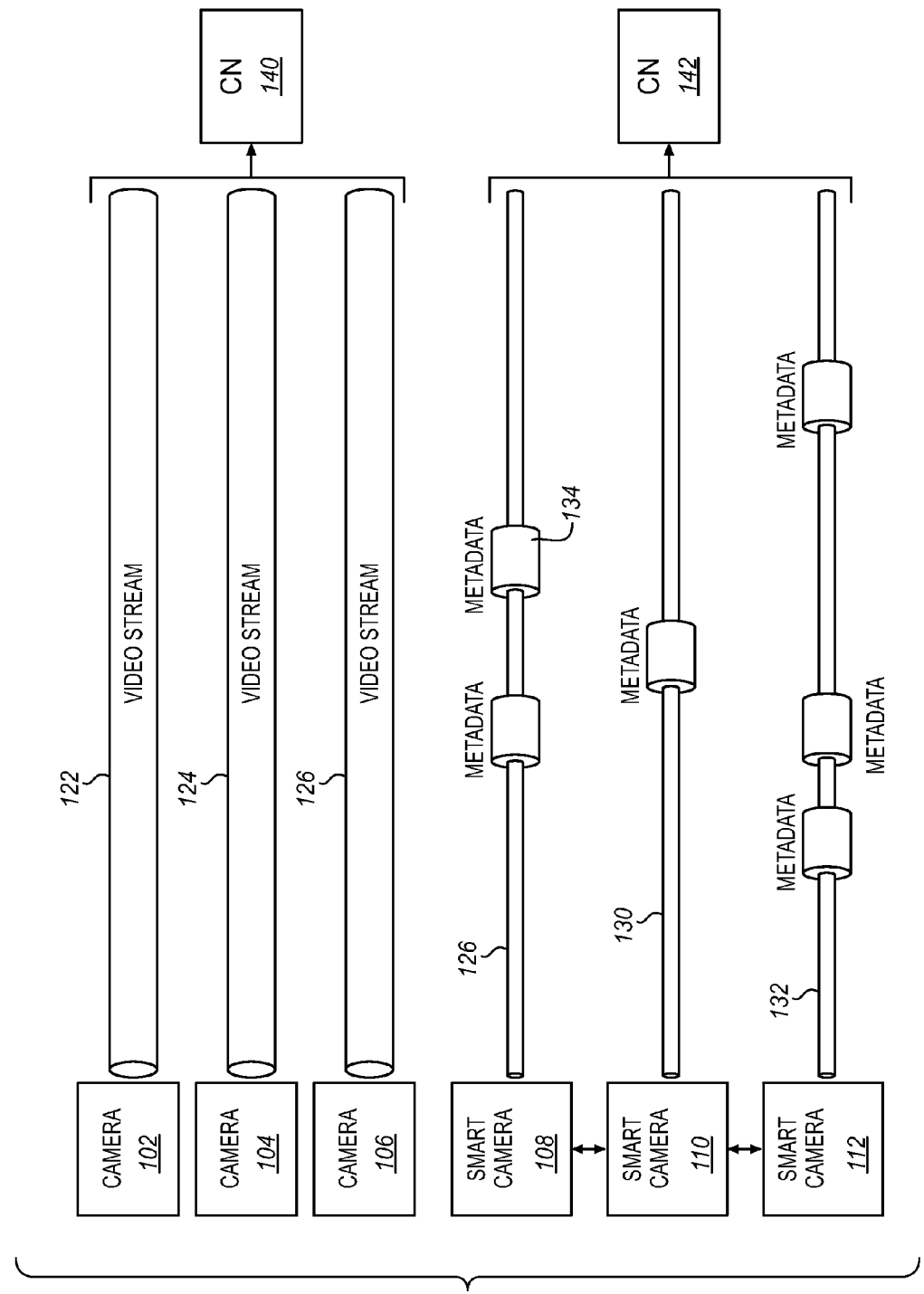
FIG. 1 is a diagram of data communications between different types of imaging nodes with a central node according to an embodiment.

FIG. 1 is a diagram of different distributed video analytics paradigms. Conventional cameras 102, 104, 106 encode and send every pixel to a central node. This central node may be a gateway to connect the cameras or camera data to another type of network an edge node or router within a larger network, a server to manage and control the cameras and the camera data or the cloud with a wide range of resources for data analytics. While the central node can take the form of any one or more of these types of nodes and assume one or more of these kinds of function, it will be referred to here as a central node. The node is central in that multiple smart camera nodes are coupled to it. Additional devices may also be coupled to it as described in more detail below.

Smart cameras 108, 110, 112 in contrast to the conventional cameras preprocess the data into predetermined semantic forms and send only sparse image data and metadata to the central node. Smart cameras can also communicate with one another to further reduce bandwidth requirements by eliminating transmission of redundant information.

As shown each of the conventional cameras 102, 104, 106 is shown as having a respective fat data pipe 122, 124, 126 to send an entire live video stream to the same central node 140. The three video streams may consume a substantial amount of the internet bandwidth for the live video feed. The data pipes are so fat, that depending on the type of camera, some network connections will not have sufficient capacity.

The smart cameras 108, 110, 112 are each shown with a smaller respective data pipe 128, 130, 132 to the central node 142. In one embodiment, these data pipes are populated with short bursts of metadata 134. The short bursts are fat but the pipes are otherwise skinny. This is to show that in between bursts, there is very little data traffic. During the bursts, there may be much more data traffic at the same time. While the three data pipes are shown as three separate and distinct data pipes, in many cases, the data pipe may be shared. The cameras may be configured as network nodes or as end points. For many network technologies, such as Ethernet, WiFi, Bluetooth, and others, the network communications resources are shared. Such a network may easily be able to handle short bursts provided that the bursts come at different times or that the bursts may be scheduled to be carried at different times.

The burst data 134 may be sent as IP (Internet Protocol) packets or as any other type of data. In addition to image data, such as video data, the metadata may include a camera ID, a time stamp, frame data (describing the image of the current frame), a tag as (metadata/semantic), and a confidence value for the metadata, if available. More or fewer of these fields may be present. The data may be formatted for IP or any other communication protocol to which the smart camera may be attached.

The conventional cameras encode and transmit all of the captured sensor data to the central node or the cloud for data analytics, e.g., face detection, face recognition, people count, etc. However, this amount of data may exceed the available bandwidth available on the network. The bandwidth is typically bounded. It is not scalable with the network which can be overloaded even with the use of the state of the art video codecs. The computation capability at the central node is bounded under real time constraints and is not scalable. The computation complexity can overload the servers. As a result, such systems are not always useful for online or real time applications.

A structure and configuration is described herein that is referred to as the SVA (Semantic Video Analytics) framework, however the invention is not so limited. The SVA framework is "scalable" and "multi-level." On the other hand, it resolves the aforementioned and other issues by making the cameras or video sensors "smarter" thus relaxing these bounds. As described herein the SVA framework abstracts common semantic forms using efficient, high detection rate search algorithms on smart cameras. A variety of different common semantic forms may be used depending on the context. The semantic form can be a face in surveillance, and cars or license plates in transportation. By extracting semantic forms, it is meant that the system analyzes incoming video to determine the portions of the frames that have meaning for the particular system. As an example for an outdoor security system, when the camera observes changes in cloud cover this does not have meaning for the security system and will be ignored. On the other hand if the cameras are not installed for a security system but for a weather system, then the changes in cloud cover are meaningful and this data will be extracted out.

The smart cameras identify and send out potential matches and, subsequently, the central node or the cloud can perform state of the art high precision algorithms for detection, tracking or recognition to deliver real time analytics without overloading the network and the computation capability. Smart cameras can also communicate with one another to reduce further the bandwidth requirements by eliminating transmission of redundant information. This is possible when the data is presented in forms that have some meaning for the system, i.e. with semantic abstraction.

The described system in some cases is a scalable end-to-end video analytics framework that uses multiple components. These include analytics on video sensors and analytics on the central node. The described techniques are capable of running on light weight, i.e. low-power sensors. The described system may be used to allow a network of cameras and other sensors to be scalable because the compression used in video sensors significantly reduces the bandwidth and the computational complexity demands on the central node. The compression is referred to as semantic compression because it provides only the parts of the video that have meaning for the system.

The described system may serve as an essential building block to visual understanding in which detection, tracking and recognition are the most important prerequisites. It also resolves the barriers in bringing video sensors into wireless sensor networks. This is because smart cameras can generate actionable insights out of the box to work with sensing and actuating modes directly. As described herein the video analytics system is scalable and effectively integrates video sensors into wireless sensor networks.

In embodiments, image sensor and other sensor data may be preprocessed into regions of interest (ROIs) on processors attached to the image or video sensors so that the systems are scalable. Using simple, low power preprocessing algorithms executing on video sensor processors distributes the computational complexity from a central server to the video sensor processors and reduces the bandwidth usage on the network and on the central node.

Smart cameras with onboard semantic abstraction can generate actionable insights out of the box and work with WSN (Wireless Sensor Nodes) directly, either as sensors or as actuators. Such an end-to-end analytics system is adaptive. In embodiments, smart cameras generating actionable insights are part of real time systems, something that is not possible with remote feature extraction. The system can also perform high precision tasks with a combination of online and offline processing.

In embodiments, a semantic meaning form is used to abstract video data in a cascaded end-to-end video analytics pipeline. The video analytics are distributed in part to the sensors. Much of this analysis may be performed in real time as the sensed data is received. This allows the sensed data to be compressed spatially, temporally, and/or semantically. In other words, for times of interest, the complete data of interest may be retained for time and places of interest. When data is compressed in the feature domain using low level features like SIFT (Scale Invariant Feature Transform) and SURF (Speeded-Up Robust Features), the features do not per se come with any semantic meaning. In some embodiments, instead of only sending SIFT or SURF features, image or video data for spaces and times of interests may be sent out. In some embodiments by compressing the image and video data in spatial and temporal domains a large amount of data may be sent out but only for spaces and times of interest. In some embodiments, only semantic metadata may be sent out.

The spatial compression may be performed by detecting objects of interest and comparing these objects to the background. The background is removed leaving only that portion of each image of the video sequence that shows the object. This part is transmitted and the rest of the image is removed. The resulting compressed images have fewer pixels than the original complete image but contain all of the image information available for the detected object. If the detected object is moving, then a different part of each image in a sequence may be removed as the object moves across the field of view of the image sensor.

By sending data only infrequently, much richer feature information may be provided without taxing the system, depending on the particular implementation. As a result, data analytics on the central node have better information and are able to achieve better results with less processing being required.

Visual understanding typically uses three stages, feature extraction, detection and tracking, and recognition. All three states can be offloaded to the camera or video sensor. Smart cameras as described herein may come with standalone feature extraction and detection/tracking. This allows the sensor to filter out irrelevant data while retaining likely matches. Depending on the context of the tasks, the central node can also perform best effort feature extraction, detection/tracking, and recognition without compromising the flexibility of the system.

Figure 2:
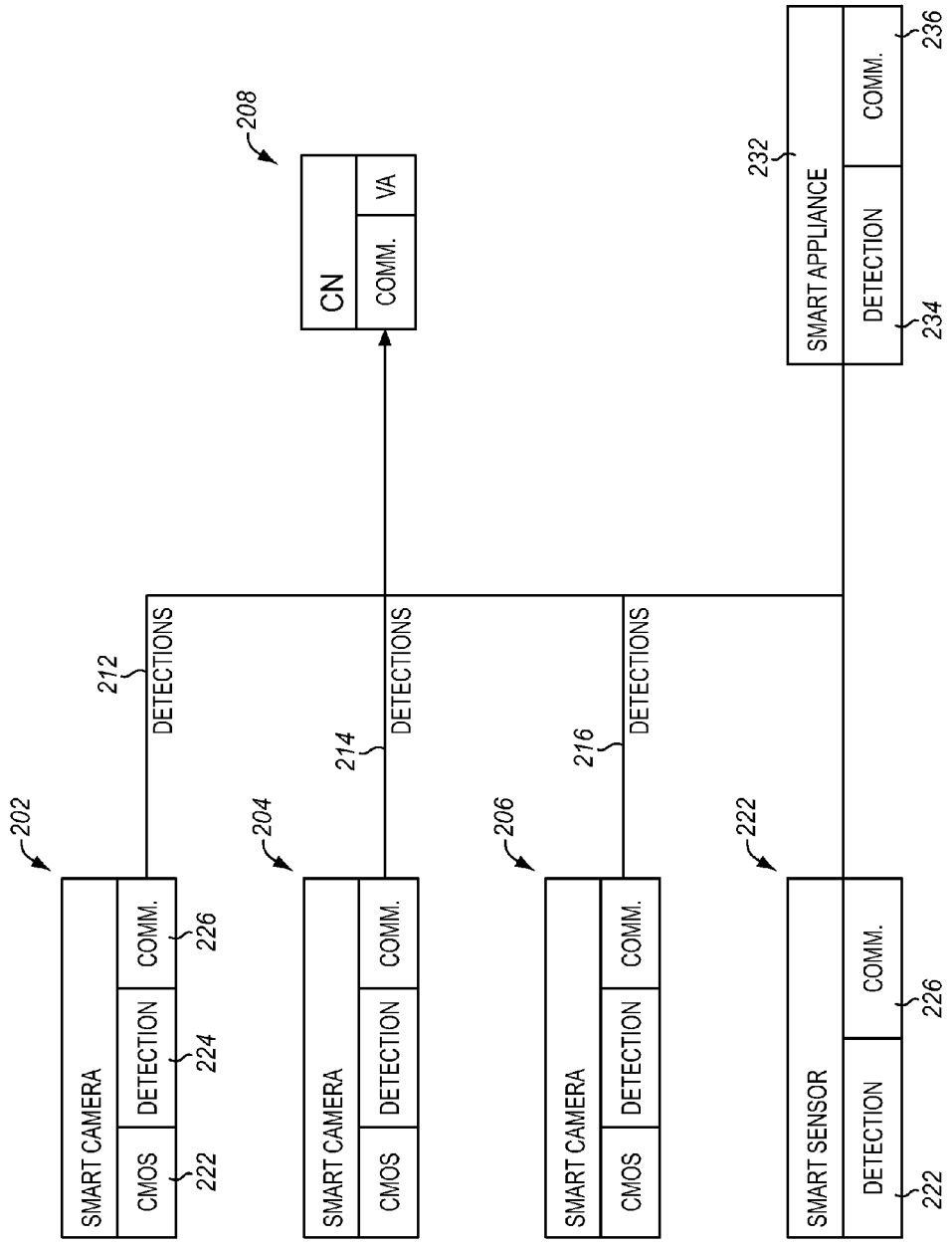
FIG. 2 is a diagram of a smart camera network according to an embodiment.

FIG. 2 is a diagram of a smart camera network with aspects of an end-to-end video analytics framework. Any number of smart cameras 202, 204, 206 capable of lightweight processing perform compression in the spatial, temporal, and semantic domain. The compression takes video streams as input from an image sensor 222 and analyzes these using onboard resources 224 to produce frames or pixels only in the regions of interest as output. This compressed data is sent through a communications interface 226. The smart camera interfaces are coupled to the central node 208 through an end-to-end or network data connection. The smart cameras each send detections 212, 214, 216 to the central node through the network.

The central node 208, depending on the nature of the tasks, performs additional or complementary video analytics on the subsets of data received from the cameras including, but not limited to, detection, tracking and recognition. The central node or server is shown as having a communications port and video analytics (VA). There may also be interfaces to other communications networks, to other servers, or to diverse types of users. The gateway 208 may be as simple as shown or may be a larger server, router, or workstation for a system which is capable of mass storage and simultaneous analytics on images from multiple cameras.

The smart cameras are similarly shown as each having an image sensor 222, which may be a CMOS (Complementary Metal Oxide Semiconductor) photodetector array or any other suitable type of image sensor. The camera further includes a detection module 224 for performing analytics on the video from the sensor and a communications port 226 to send collected data to the central node 208.

Each smart camera is able to perform an onboard semantic abstraction. The process may be adapted to be within the processing abilities of the onboard processors. Video sensors consume high power so that the power consumption of the processor may be designed to avoid significantly affecting the total power budget. For example, surveillance cameras on power over Ethernet (PoE) usually cannot afford to allow more than 5-15 W for computation purposes. In embodiments, the smart cameras in this system perform segmentation with background learning, object detection, and adaptive end-to-end analytics.

Segmentation as described herein provides for the smart camera to adapt to changes. An image background in a video changes from time to time because the environment can change, e.g., lighting, and the heading orientation of a camera can change. A Gaussian Mixture Model (GMM) may be used to learn independent background models for each pixel. Specifically, each pixel may be modeled with one GMM model to learn the local background features. GMM is robust against noise because constant rate motions and recurring motions such as leaves in an outdoor scene are not of interest. The GMM allows for the background to be modeled but other techniques may alternatively be used such as frame differencing, a mean filter, Gaussian averaging, etc.

Once a background can be determined online in real time, it is much easier to determine the foreground. However, the analytics may be performed without any background analysis processes. The foreground may then be used as the input for computer vision tasks.

Object detection allows the smart camera to send only the useful image data to the central node. There are common forms of information in video analytics that can be abstracted. Objects may be detected using different techniques depending on the camera and the particular type of object to be detected. For a face a skin tone-based face detector may be used, Haar-based face detection, LBP-based (Local Binary Pattern-based) face detection, SIFT-based (Scale Invariant Feature Transform-based) face detection, and other techniques may alternatively or additionally be used. For detecting other objects, other techniques may be used instead.

In addition to these features the cameras may be able to communicate command and control with the central node. The camera may be able to power on or off, to change capture or frame rate, to aim in different directions, and to operate a lens and a lighting system. The lens may be able to change focus point or focal length and the lighting may be able to illuminate a target with visible, infrared, or ultraviolet light, depending on the particular use of the camera. All of these functions may be controlled by the central node through the network interface shown in FIG. 2.

The framework of FIG. 2 may also include many more smart cameras as well as other smart devices. As examples a smart sensor 222 and a smart appliance 232 are shown. These are connected to the network and communicate with the central node 208 or the smart camera 202 in the same way that the cameras do. They provide information/command/control and/or may be commanded or controlled remotely by the central node or a user interface or other network device 232 connected to the central node.

The smart sensor may be an environmental sensor such as a thermometer, barometer, etc. or a current sensor to determine if a device is operating or switched on. The smart sensor has a detection module 224 and a communication port 226 so that the condition can be detected or measured and the result sent to the central node or the smart camera.

The smart appliance may be a thermostat, a refrigerator, any other household appliance or an industrial tool. The appliance, in addition to performing its primary appliance function, has a detection module 234 to determine its status or condition and a communications module 236. Any type of smart sensor and smart appliance may be coupled to the network using a variety of different standards, protocols, and conceptual frameworks including WSN (Wireless Smart Network) and IoT (Internet of Things).

Figure 3:
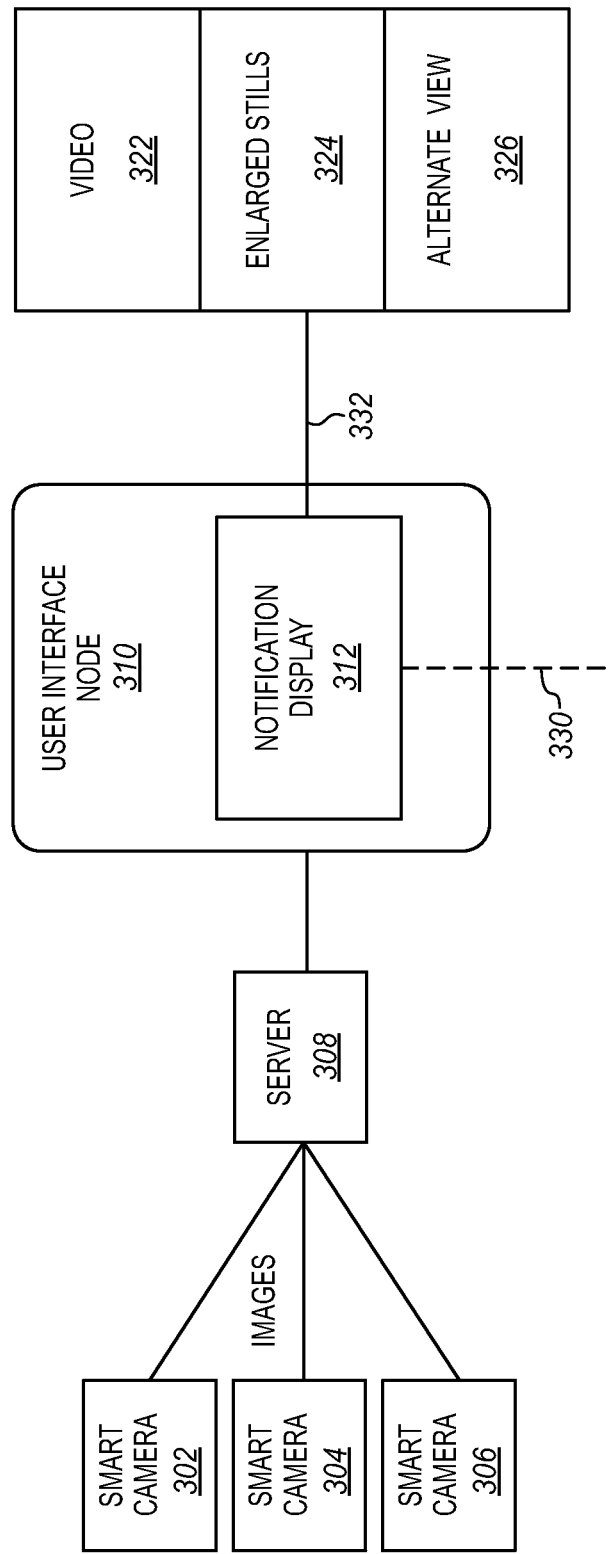
FIG. 3 is a hybrid diagram of a smart camera network and example user interface according to an embodiment.

FIG. 3 presents a use of the present invention in a hybrid diagram. Three smart cameras 302, 304, 306 are coupled to a server 308 and send temporally and spatially compressed video with metadata to the server under the control of the server. As described above, using video analytics, the smart cameras generate insights based on a semantic abstraction of the images. These insights are used to select the metadata and image data that is sent to the server. The server receives and analyzes the received metadata and video, if any, and when certain conditions are detected, it generates its own insights. These may be used to send a notification 312 to a user interface 310. In this example the notification is in the form of a screen display on a portable device, such as a smart phone. However, the notification may be at a workstation or desktop machine or a dedicated terminal of any desired form. The notification may take any of a variety of different forms. In this example, a frame of the video is shown together with some identifying text or icons.

The user upon receiving the notification 312 is presented with an interface that allows the user to neglect the notification 330 or to accept the notification 332 and obtain more information. The several cameras and the rich information from each camera allow the user to obtain a great amount of information. A few choices are presented as examples, but the invention is not so limited. Each choice may be selected by a user command or simply presented automatically based on preset instructions. The first display 322 presents a replay of the video sequence that resulted in the notification. The second display 324 provides still images of the face of the person in the video. The face may be extracted out using feature recognition. The third display 326 provides a video captured at the same time from a camera in a different position. This provides a different view of the same scene at the same time.

Adaptive end-to-end analytics may be provided based on normal server technologies. The incoming results from the video sensors may be further processed by pruning false alarms, storing related relevant images and videos, and adding additional information about location, time, etc. to any alert. Depending on the nature of the tasks, this pruning may include, but is not limited to feature extraction, detection/tracking, and recognition. While the smart cameras have filtered out many possible false alarms, the greater computing power of the central node may be used to provide still better results.

Any desired video analytics system may be used to suit a particular application, e.g., surveillance and human computer interface. Color-based segmentation may be used to determine skin colored pixels while prior knowledge of size, dimension, and shape may be used to reject false alarms. A similar approach may be used to read license plates, track birds, etc. The smart cameras may independently run separate operations to retain positive samples, while the server may run full a visual understanding pipeline on the information received from the smart cameras.

In a real-time face recognition application, the camera may be used for skin tone detection. This information may be sent to the gateway to perform more complex face detection. The information may be sent to the cloud to perform face recognition. By performing even a simple pre-filtering the transmitted data may be greatly reduced while the gateway uses additional resources to check the results.

In a license plate scenario, the smart camera may be used to detect the presence of a license plate. These images may be sent to the gateway to recognize the characters on the plate and the issuing authority. In the cloud, the license plate number may be applied to a registration, criminal, or fee database for any of a variety of different purposes.

In a smart lighting context there may be some choreography based on occupancy. The smart camera may detect motion and then send a detection signal to a smart light switch to activate the lights. A similar approach may be used with face recognition to activate a smart door lock. A gateway or local node may be used to analyze a face received from a camera to determine whether to actuate the door lock. A smart people counter may use the smart cameras for people detection and then increment a counter connected through the network.

Figure 4:
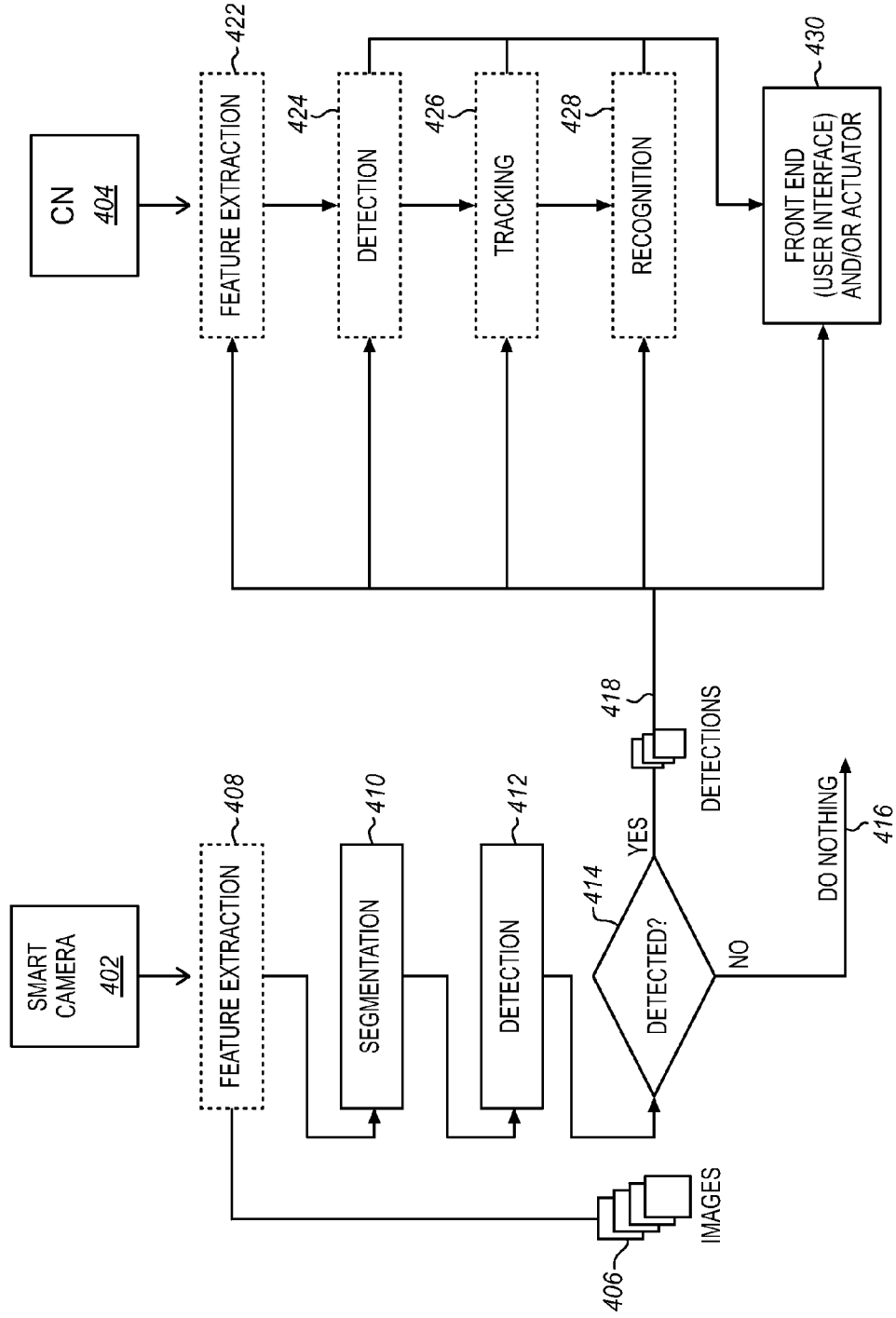
FIG. 4 is a diagram of operations for adaptation and exchange across a network according to an embodiment.

FIG. 4 is a diagram of an end-to-end process and how operations may be shared, exchanged, and adapted between remote or local nodes and central nodes or servers. On one side is a smart camera 402 which may be an image sensor for still or video images or any other type of environmental sensor for other conditions. The image sensor may detect visible light or light in another wavelength, such as infrared, ultraviolet, microwave, etc. The smart camera receives a sequence of images or frames 406 from the image sensor and any of a variety of different tasks such as segmentation 410 and detection 412 to reject backgrounds. If there is a foreground object detected at 414, then the smart camera will send out information 418 on the object, such as an image/video segment and metadata. If there are no detected objects then nothing is sent at 416.

The smart cameras have built-in functionality to reject backgrounds, and only send out information once objects of predetermined semantic forms are detected. This reduces a video stream of continuous frames into intermittent detections (detections within bounding boxes), and allows network connectivity to be used for many more sensors. The smart camera may use feature detection 408 as well on the frames to add additional metadata to the information sent to the central node.

The central node 404 then takes the detections 418 as input and performs computer vision, image processing, or object recognition tasks. These tasks as shown are feature extraction 422, detection 424, tracking 426, and recognition 428. Any one or more of these tasks may be performed or not performed as the system adapts to different circumstances. The central node may also provide a front end such as a user interface or actuator 430, such as the interface 310 of FIG. 3, for consumption of the information. The front end may also include devices that can take actions in response to actionable insights generated by the central node. Other interfaces may also be used to forward the analytics to other systems for use.

As shown the central node 404 is coupled to an actuator 430 and the central node sends a command to the actuator based on the insight. If the insight is actionable, then the actuator may perform an action. In some embodiments, insights are generated by the central node based on the metadata and any other data that is received from the smart cameras 402. These insights are then sent to the front end or actuator, instead of the data received from the smart cameras or some portion of that data. This insight may be of a form used in other IoT system. The insights may be translated to actions that a human or machine (actuator) can perform. For a user interface an action may be taken manually based on an insight. For an actuator, an action may be taken automatically. The front end may contain both user interface and actuator components. The insights may also be sent to being sent to provide notice that a visualization is available as in FIG. 3 wherein the user interface node is able to receive various views.

Onboard computation at the smart camera may be adapted to suit different contexts and be optimized for diverse objectives, such as throughput, power efficiency, latency, etc. The amount of and the kind of computation on the camera may include one or more of detection, recognition, and tracking techniques and the specific techniques may be adapted based on the context. Using collected history and other information from one or more cameras and other sensors and from other data including configuration data, the central node may provide additional instructions to each smart camera to adjust the amount and kind of operations performed by the camera. In addition, the smart camera may response autonomously to the bandwidth or power available to the camera to adjust the amount or kind of computation.

The end-to-end analytics can be changed to many different configurations to adapt to different usage scenarios at different times. The different capabilities may be connected together in different way. A few examples of how the central node or a server may be used may be listed as follows:

(1) Smart Camera to Frontend.

Frames received from a particular smart camera are sent directly from the smart camera through the central node to the user interface, the smart camera is relied upon to filter results;

(2) Smart Camera to Recognition to Frontend

Frames are sent from the central node to the user interface only if recognition reveals an event;

(3) Smart Camera to Tracking to Frontend

Frames are sent from the central node to the user interface with tracking to show observed movement of an object recognized by the smart camera;

(4) Smart Camera to Detection to Frontend

Frames are sent when specified types of objects are detected by the central node;

(5) Smart Camera to Feature Extraction to Detection to Frontend

Frames are sent after the central node extract features from the received video and uses the features to detect specified types of objects.

On the central node 404, the processes may be adaptive depending on the context and the applications. As an example, in computer vision, a feature is often the most important element, from primitive corner features, to gradient features to automatically learned features from deep learning. Features come in a variety of different forms but are often all useful for particular tasks, depending on the constraints, requirements, context and applications. Compared to abstracting into low level features that can limit the usefulness of the data, in some embodiments, the data is instead reduced into semantic forms, i.e. subsets of a frame. This keeps later flexibility to produce any number of different feature extractions.

The described semantic abstraction and smart networked cameras open vast possibilities in central node analytics because it is adaptive. The system is not constrained by any particular feature presentation. The data are compressed in a spatial and temporal domain with the use of video analytics on the smart cameras.

Figure 5:
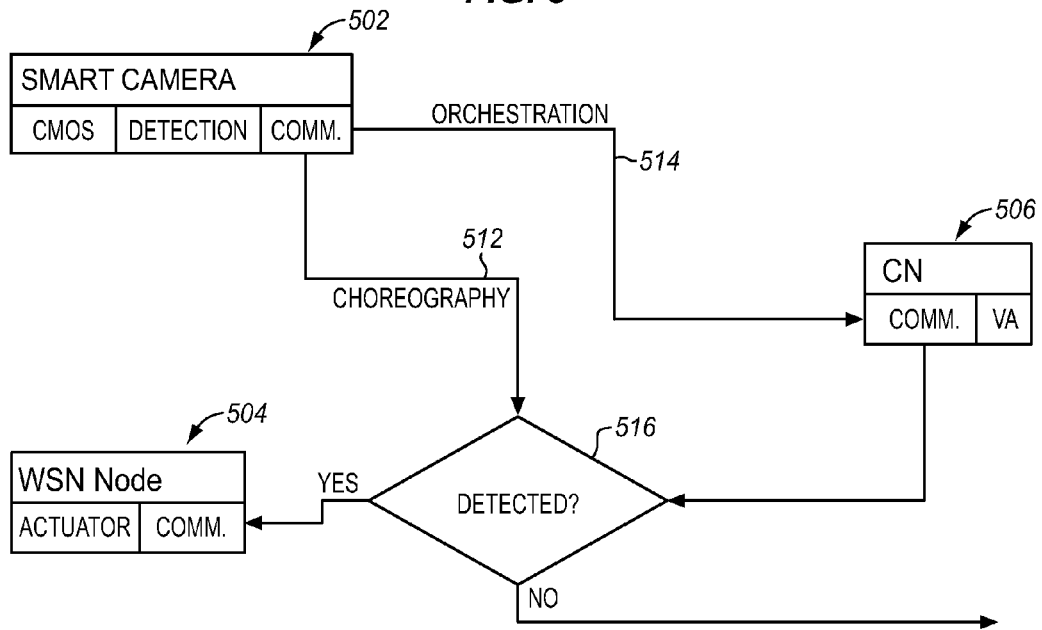
FIG. 5 is a diagram of a wireless smart network with multiple nodes showing different interactions according to an embodiment.

The described embodiments also open immense possibilities in M2M/IoT (Machine to Machine/Internet of Things) services, which may include orchestration and choreography services as indicated in FIG. 5. In some systems, the cameras cannot generate metadata. As a result, the camera data is made useful by being processed on the central node. This can increase the turnaround time or latency with the central node. This also limits the use of cameras in M2M/IoT choreography. By including a capability to perform semantic extraction to a video sensor, the metadata may be used for choreography between any two video sensors.

FIG. 5 is a diagram of a smart network such as a wireless smart network with multiple nodes showing different interactions between the nodes. In FIG. 5 a smart camera, for example applying the SVA principles discussed above is coupled into a M2M/IoT network. The smart camera is coupled to a central node 506 and to other WSN nodes. The nodes all include communication interfaces and sensor, detection, actuator devices, depending on the particular implementation. The smart cameras 502 may be operated with M2M/IoT services in both choreography 512 and orchestration 514 manners.

In choreography, smart cameras are able to generate actionable insights and communicate directly with actuating nodes in wireless sensor networks. In orchestration, the central node takes detections as input from smart cameras and determines whether or not to trigger actuating nodes based on video analytics on the central node.

As illustrated, in choreography 512 detections are sent directly to another node 504 for an action by that node. The detection 516 is shown as separate from the smart camera. The detection may be the detection within the smart camera or in some other connected unit that is connected to or a part of the other node. As shown, if there is a detection, then the other node 504 receives the data from the smart camera and then may activate an actuator as appropriate. In orchestration 514, the central node or a server receives the metadata and orchestrates the actions of other devices. The detection 516 comes from and is determined by the central node and is sent to the other node 504 when a detection has occurred.

The described embodiments provide a cascaded end-to-end video analytics framework with the use of onboard semantic abstraction on smart cameras. The approach improves scalability. By deploying video analytics on video sensors and only sending semantic data, video analytics framework is more scalable as the barrier in video analytics framework can be effectively resolved by substantially reducing the communication and computing overhead.

The system also improves flexibility. Rather than extracting low level features which can limit the usefulness of the data on the central node, the use of semantic form can effectively reduce the communication overhead while retaining fine details of objects of interest. The smart cameras compress the video data in the spatio-temporal domain instead of any feature domains.

The system also improves versatility. Video data is more useful after it has been processed into semantic forms, e.g., face, people, car, etc. When semantic forms can come out from video sensors rather than from the central node, then more M2M/IoT services may be deployed choreographically. This can also be used in applications requiring quick turnaround because latency is reduced.

Figure 6:
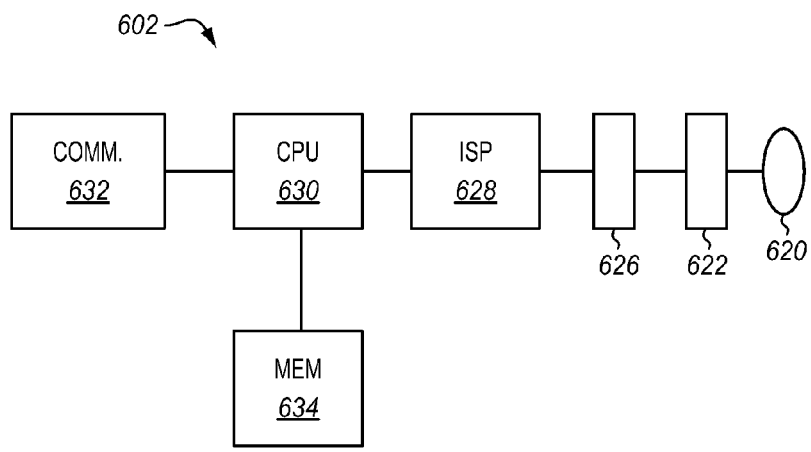
FIG. 6 is a diagram of a smart node for a network according to an embodiment.

An example smart camera 602 is shown in an expanded diagram view in FIG. 6 with a lens 620 to image the scene onto an image sensor 622, such as a CMOS photodetector array. The lens may have adjustments for focus and zoom as well as other image sensing parameters. There may be shutters, controllable aperture diaphragms, filters, shades and other elements (not shown) between the lens and the image sensor. The image sensor data is provided to a sample and hold circuit 626 to convert the data into a set of pixel values. The pixel values are then processed in an image signal processor 628.

The system is controlled by a general purpose processor 630 or any other type of processor which may or may not present a user interface (not shown) including an image view on a display. The processor is also coupled to a communications interface 632 for access to the central node and to other nodes. The interface may be wired or wireless or a combination of both. A memory 634 provides a buffer for video analytics and metadata during processing and before communication. The camera may have many more or fewer components than shown, depending on the particular implementation. The feature extraction, segmentation, detection, and other analytic operations may be performed by the ISP, CPU, another resource (not shown) or any combination of those resources.

The smart camera is able to function as one of many remote nodes in a network controlled by the central node. The smart camera may have more than one communications interface to allow independent or autonomous communication with another device, such as an authorized user device or a different remote security system. In other embodiments, the smart camera is a remote node that communicates only with the central node. The central node performs all other communications with any other devices or resources such as users or remote databases.

Figure 7:
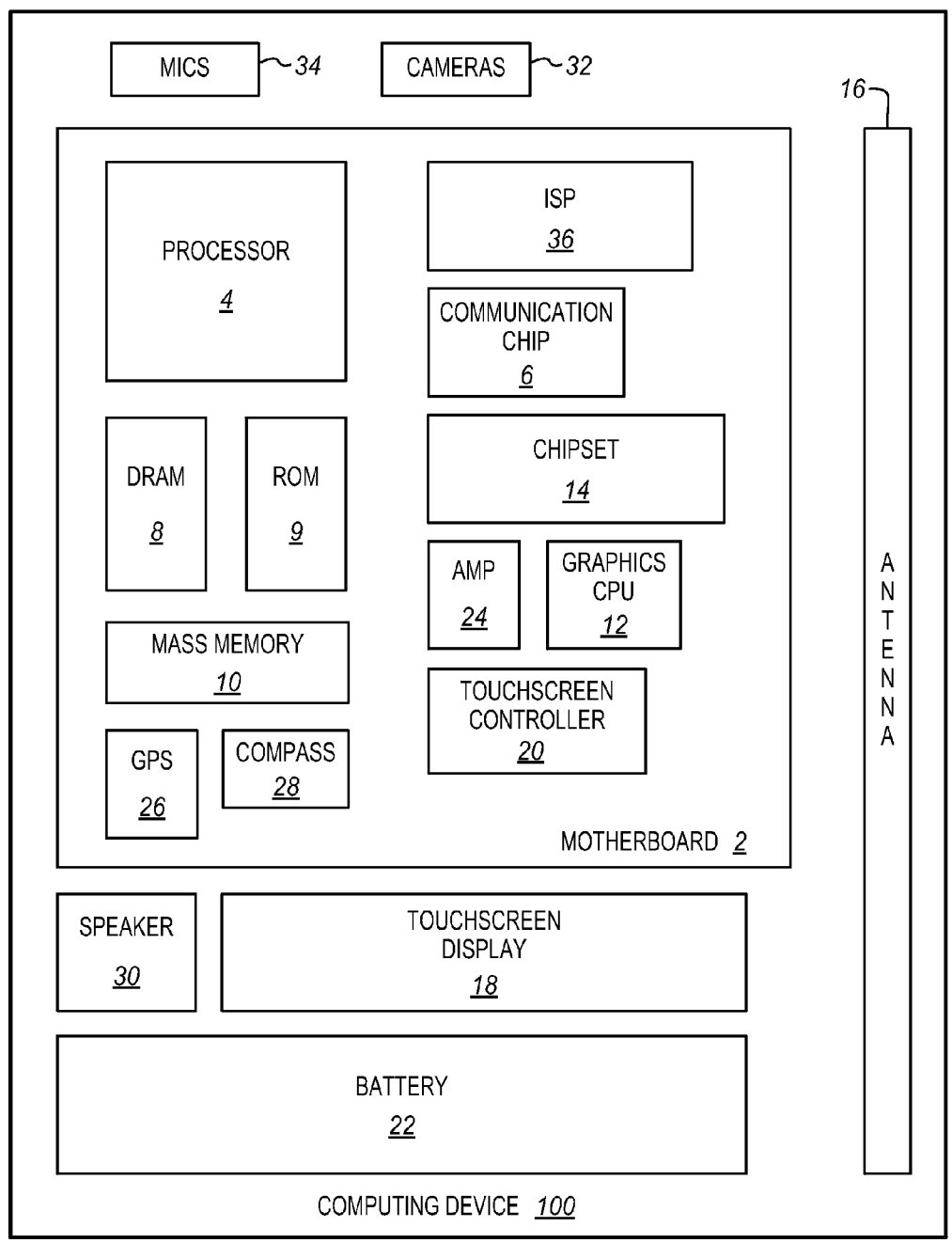
FIG. 7 is a block diagram of a central node or user interface for communication with imaging nodes according to an embodiment.

FIG. 7 illustrates a computing device 100 suitable for use as a central node or a smart camera node in accordance with embodiments. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

For a smart camera application, the camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may include all of the components of the camera 602 of FIG. 6 or share resources, such as memory 8, 9, 10, processing 4 and user interface 12, 20, with other video device components and functions. The processor 4 is coupled to the camera and to memory to receive frames and perform analytics on local or remotely received images as described. The cameras may also include an image processing system, as described above, for video analytics.

In various implementations, computing device 100 may be a gateway, a router, a server, a workstation, a cellular telephone, a media player, a laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus that includes an image sensor to generate a sequence of images, a processor coupled to the image sensor to analyze the sequence of images to detect an event, to select images related to the event and to generate metadata regarding the event, and a communications interface coupled to the processor to send the metadata information through a network connection to a central node.

In further embodiments the communications interface is further to send the selected images with the metadata to the central node.

In further embodiments the processor is further to compress the selected image by removing parts of the image not related to the detected event.

In further embodiments the processor is further to perform spatial compression on the selected images.

In further embodiments the spatial compression removes the background from each of the selected images and not objects related to the detected event.

In further embodiments the communications interface does not send the metadata unless an event is detected.

In further embodiments the event is detected using segmentation and the selected images are a video segment.

In further embodiments the metadata includes temporal or spatial information of the event.

In further embodiments the metadata includes a confidence value for the detection of the event.

In further embodiments the metadata includes a time stamp for the detection of the event.

In further embodiments the processor performs feature extraction to extract features from the sequence of images, object detection to detect objects from the sequence of images using the extracted features, and object recognition to recognize detected objects, and wherein the selected images are images which contain recognized objects.

In further embodiments the communications interface receives commands from the central node or another node to adjust parameters for analyzing the sequence of images.

Some embodiments pertain to an apparatus that includes a plurality of cameras each connected to a network as a network node, each camera having a sensor to receive a sequence of images, a processor to analyze the images, to select at least one image, and a communications interface to send the selected images to a central node, and a central node to receive the images and to generate an insight based on the received images.

In further embodiments the camera processors are further to spatially compress the selected image, and wherein the communications interface is further to send the selected image to a central node.

In further embodiments analyzing the images comprises detecting an event regarding an identified object in the selected image and wherein the communications interface sends metadata to the central node regarding the identified object.

In further embodiments spatially compressing comprises removing a background from the selected image and not the identified object.

In further embodiments the central node further comprises a processor to perform object detection on the selected image and wherein the insight comprises an insight of a detected object.

In further embodiments the central node is coupled to a user interface and the central node sends the generated notification to the user interface.

In further embodiments the central node is coupled to an actuator and the central node sends a command to the actuator based on the insight.

Some embodiments pertain to a method that includes receiving a sequence of images from an image sensor of a remote network node, analyzing images of the sequence of images at the remote node to detect an event, selecting at least one image from the sequence of images that is related to the detected event.

generating metadata regarding the selected image, and sending the selected image and the metadata from the remote node to a central node.

In further embodiments the metadata identifies the detected event.

Further embodiments include compressing the selected image by removing parts of the image not related to the detected event.

Some embodiments pertain to a machine-readable medium having instructions that, when operated on by the machine, cause the machine to perform operations that include receiving a sequence of images from an image sensor of a remote network node, analyzing images of the sequence of images at the remote node to detect an event, selecting at least one image from the sequence of images that is related to the detected event, generating metadata regarding the selected image, and sending the selected image and the metadata from the remote node to a central node.

In further embodiments the metadata identifies the detected event.

Further embodiments include spatially compressing the at least one selected image by removing a background from each image, wherein the background is not related to the detected event.

In further embodiments the operations for selecting at least one image further comprising feature extraction to extract features from the sequence of images, object detection to detect objects from the sequence of images using the extracted features, and wherein the selected images are images which contain detected objects.

In further embodiments the operations for selecting at least one image further comprising object recognition to recognize detected objects, and wherein the selected images are images which contain recognized objects.

What is claimed is:

1. A networked camera comprising:
    an image sensor to generate a sequence of images;
    a processor coupled to the image sensor to abstract semantic forms, to compress data from the images in the feature domain using the semantic abstraction, to generate sparse image data describing low level features based on the compressed image data, to generate actionable insights based on the semantic abstraction, and to select the sparse image data and metadata to be sent to a central node based on the insights; and
    a communications interface coupled to the processor to send the sparse image data describing low level features and metadata information through a network connection to a central node so that the central node is able to perform detection, tracking and recognition on the received sparse image data and metadata.

2. The apparatus of claim 1, wherein the communications interface is further to send the sparse image data and metadata to the central node only when objects of predetermined semantic forms are detected.

3. The apparatus of claim 1, wherein the processor is further to recognize an object in images of the sequences of images to detect an event and to compress a selected image by removing parts of the image not related to the detected event as determined using the recognized object.

4. The apparatus of claim 3, wherein the processor is further to perform spatial compression on selected images.

5. The apparatus of claim 4, wherein the spatial compression removes the background from each of the selected images and not the recognized object related to a detected event.

6. The apparatus of claim 1, wherein the processor is further to detect an event using segmentation of each image and the selected images are a video segment.

7. The apparatus of claim 1, wherein the metadata includes as confidence value for the detection of an event.

8. The apparatus of claim 7, wherein the metadata includes a time stamp for the detection of the event.

9. The apparatus of claim 1, further comprising the central node, the central node comprising a processor and wherein the central node processor performs feature extraction to images of the sequence to extract features from the sequence of images, object detection to the extracted features to detect objects from the sequence of images using the extracted features, and object recognition to the detected objects to recognize detected objects, and wherein the selected images are images which contain recognized objects.

10. The apparatus of claim 1, wherein the communications interface receives commands from the central node or another node to adjust parameters for analyzing the sequence of images.

11. An apparatus comprising:
a plurality of networked cameras each connected to a network as a network node, each camera having a sensor to receive a sequence of images, a processor to abstract semantic forms, to compress data from the images in the feature domain using the semantic abstraction, to generate sparse image data describing low level features based on the compressed image data, to generate actionable insights based on the semantic abstraction, and to select the sparse image data and metadata to be send to a central node based on the insights, and a communications interface to send the sparse image data describing low level features and metadata to a central node; and
a central node to receive the sparse image data and metadata and to perform detection, tracking and recognition on the received sparse image data and metadata.

12. The apparatus of claim 11, wherein the camera processors are further to spatially compress a selected image, and wherein the communications interface is further to send the selected image to a central node.

13. The apparatus of claim 12, wherein the processor is further to detect an event regarding an identified object in the selected image and wherein the communications interface sends metadata to the central node regarding the identified object.

14. The apparatus of claim 13, wherein the processor is further to spatially compress the selected image removing a background from the selected image and not the identified object.

15. The apparatus of claim 11, wherein the central node further comprises a processor to perform the object detection on the selected image and wherein the insight comprises an insight of a detected object.

16. The apparatus of claim 11, wherein the central node is coupled to a user interface and the central node sends the generated insight to the user interface.

17. A method comprising:
receiving a sequence of images from an image sensor of a remote network node;
analyzing images of the sequence of images at the remote node to abstract semantic forms from the images of the sequence, to compress data from the images in the feature domain using the semantic abstraction, to generate sparse image data describing low level features based on the compressed image data, and to generate actionable insights based on the semantic abstraction;
selecting the sparse image data to be sent to a central node based on the actionable insights;
generating metadata regarding the selected sparse image data; and
sending the selected sparse image data and the metadata from the remote node to a central node for detection, tracking, and recognition.

18. The method of claim 17, wherein the metadata identifies the actionable insight.

19. The method of claim 17, further comprising recognizing an object in images of the sequences of images to detect an event and wherein compressing comprises compressing by removing parts of the images not containing the recognized object as not related to the detected event.

20. A non-transitory machine-readable medium having instructions that, when operated on by the machine, cause the machine to perform operations comprising:
receiving a sequence of images from an image sensor of a remote network node;
analyzing images of the sequence of images at the remote node to abstract semantic forms from the images of the sequence, to compress data from the images in the feature domain using the semantic abstraction, to generate sparse image data describing low level features based on the compressed image data, and to generate actionable insights based on the semantic abstraction;
selecting the sparse image data to be sent to a central node based on the actionable insights;
generating metadata regarding the selected sparse image data; and
sending the selected sparse image data and the metadata from the remote node to a central node for detection, tracking, and recognition.

* * * * *